Nov. 21, 1933.    O. H. HANSEN    1,935,777
PROCESS OF TREATING FLUIDS
Filed May 26, 1930
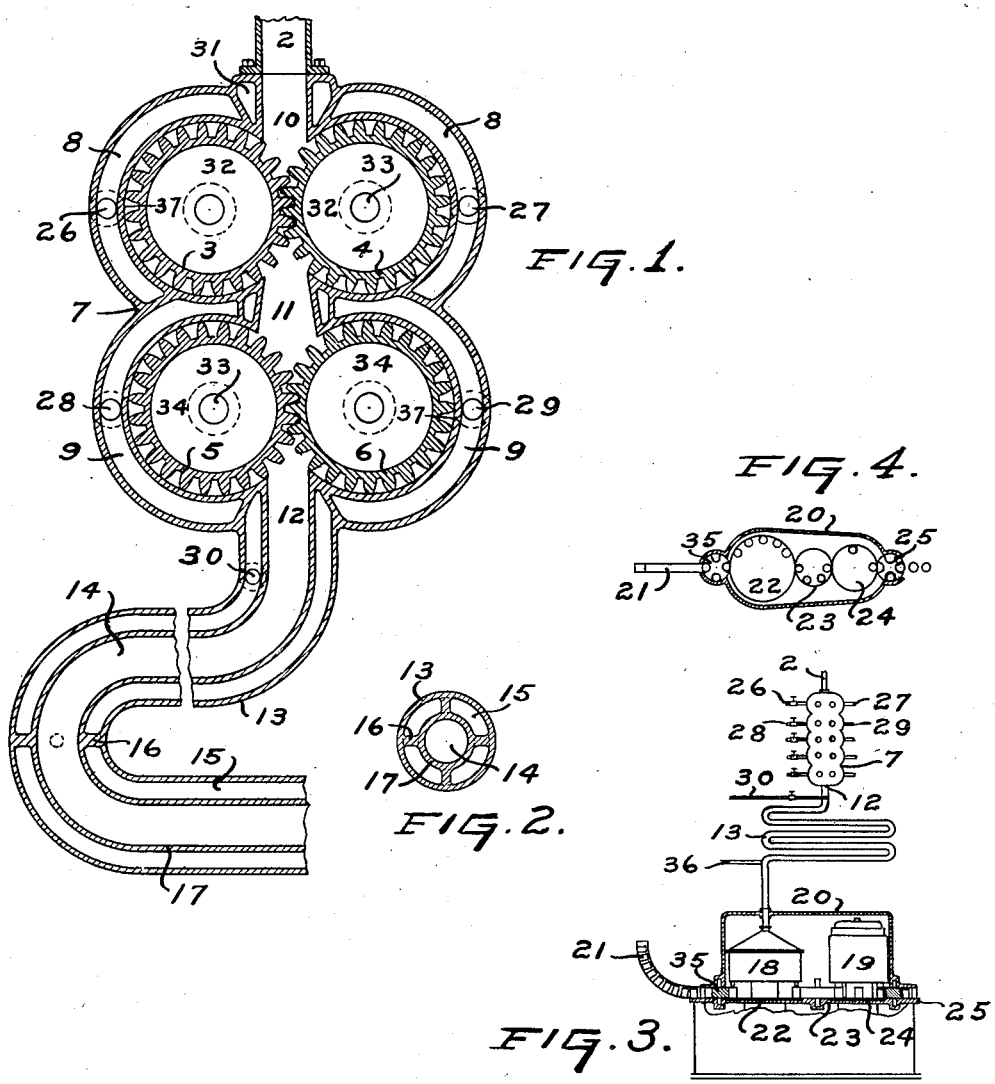
INVENTOR
O. H. Hansen
BY
W. H. Lieber
ATTORNEY.

Patented Nov. 21, 1933

1,935,777

UNITED STATES PATENT OFFICE 1,935,777

PROCESS OF TREATING FLUIDS

Oswald H. Hansen, Cedarburg, Wis., assignor to Hansen Canning Machinery Corporation, Cedarburg, Wis., a corporation of Wisconsin Application May 26, 1930. Serial No. 455,579

2 Claims. (Cl. 99—15)

The present invention relates in general to improvements in the art of treating fluent substances, and relates more specifically to an improved process of heat treating commodities such as milk, in order to preserve the same.

An object of the invention is to provide a new and useful process of accomplishing effective heat treatment of fluent materials having characteristics simulating those of animal milk or the like.

The heat treatment or so called processing of edible substances, requires two important considerations. The primary consideration is that the food product be subjected to a temperature sufficiently high for a sufficient period of time, to destroy all harmful bacteria in the product. The secondary consideration is that the treating process avoid deteriorating the product so that the food will remain in its natural and palatable condition throughout the processing operation and after the same has been packed. While it is a relatively simple matter to attain and maintain both of these desirable conditions when processing most vegetables and meats, even with relatively unskilled labor, it is extremely difficult to accomplish such results in the treatment of more delicate fluids such as ordinary cow's milk.

As is well known in the canning industry, milk when heated to too high a temperature, will scorch and tend to stick to the confining surfaces. This scorching produces discoloration of the product and also creates an unnatural taste, both of which are extremely objectionable. While numerous efforts have been made by men highly skilled in the sterilizing art, no known process of heat treating milk has yet been originated, whereby such product can be effectively sterilized, without depreciating the appearance and taste thereof, with sufficient speed to meet commercial requirement, and with the aid of relatively unskilled labor and simple machinery.

It is a more specific object of the present invention to provide an improved process of rapidly and effectively sterilizing fluids such as milk, without in any way degrading the same. Another specific object of the invention is to provide for the processing of food products such as milk, in bulk, that is prior to packing thereof. These and other specific objects of the invention will be apparent from the following detailed description.

A clear conception of the several steps of the improved process, and of the construction of and mode of operating one type of apparatus capable of commercially exploiting the improved process, may be had by referring to the drawing accompanying and forming a part of this specification in which like reference characters designate the same or similar parts in the various views.

Fig. 1 is a central vertical section through a two compartment sterilizer for fluent material, showing a fragment of a cooling coil associated therewith.

Fig. 2 is a transverse section through the cooling coil.

Fig. 3 is a part sectional diagram of a combined milk processing and packing installation embodying the improvement.

Fig. 4 is a transverse horizontal section through the installation of Fig. 3, the section being taken through the can transporting chamber.

Referring specifically to Figs. 3 and 4, the improved processing and packing installation comprises in general a fluid supply pipe 2; a heating device or sterilizer 7; a cooling device or coil 13; a measuring and feeding device or filler 18; a can sealing or closing machine 19; mechanism for supplying and transporting the cans to and past the filler 18 and closing machine 19; and a hermetically sealed casing 20 for confining the cans during filling and closing.

The improved sterilizer 7 specifically illustrated, comprises a casing having several superimposed openly communicating sets of contiguous circular chambers provided with arcuate bounding surfaces 37. Located within the upper set of chambers, is a pair of hollow rotors 3, 4 having intermeshing peripheral projections or teeth similar to those of spur gears. The hollow peripheral-toothed rotors 3, 4 are rotatably supported and driven by shafts having passages 33 therein for introducing heating medium such as steam at any desired temperature, to the interiors 32 of these rotors. The supply orifice 10 which connects the upper rotor chambers with the fluid supply pipe 2, is provided with a cooling jacket 31 to which a cooling medium such as water may be admitted, and the bounding surfaces 37 of the upper chambers may be heated to any desired temperature by means of steam admitted to jackets 8 through valve controlled pipes 26, 27. A similar pair of hollow rotors 5, 6 likewise having intermeshing peripheral teeth coacting with the arcuate bounding surfaces 37 of the corresponding set of chambers, are rotatably disposed within the lower chambers, and the hollow interiors 34 of the lower rotors 5, 6 may likewise be supplied with heating medium such as steam at relatively high temperature, through passages 33 formed in the supporting and driving shafts thereof. The intermediate orifice 11 which connects the upper and lower sets of chambers, is also jacketed for cooling purposes, and the bounding surfaces 37 of the lower chambers may be heated to a relatively high temperature by means of steam admitted to jackets 9 through valve controlled pipes 28, 29. The discharge orifice 12 communicating with the lower set of chambers should likewise be water jacketed, and may either communicate with another set of rotor confining chambers, or with a cooling device or coil, depending upon the degree of heating and upon the increments of increase in temperature between successive stages, desired. The rotors 3, 4, 5, 6 may be rotated at any desired speed by the application of power to the hollow supporting shafts thereof, but must be rotated in such direction that the intermeshing portions of all of the rotors move upwardly.

The cooling device or coil 13 is in open communication with the lowermost set of heating chambers, and comprises an inner pipe 17 forming a fluid conducting conduit 14 spaced from an outer casing by means of spacers 16 to form a cooling jacket 15. Cooling medium such as water may be admitted to the jacket 15 through a valve controlled pipe 30, and may be discharged therefrom through a similar pipe 36. The coil 13 may be of any desired length dependent upon the degree of cooling required, and communicates directly with the filler 18, as shown in Fig. 1.

The mechanism for delivering the successive empty and pre-sterilized cans to the filler 18, comprises a can supply chute 21 and a sealing rotor 35 adapted to introduce the cans in succession into the sealed steam heated chamber within the casing 20. A can conveyor disk 22 is adapted to receive the successive cans from the rotor 35 and to transport the same beneath the filler 18, whereupon the filled cans are supplied with covers while being conveyed toward the closing machine by means of a transfer disk 23. Another can conveyor disk 24 is formed to receive the filled cans with the caps loosely applied, and to transfer the same through the closing machine 19 after which the sealed cans are discharged from the casing 20 by means of another sealing rotor 25. This conveying mechanism is of relatively standard construction and need not be illustrated in greater detail than shown in Figs. 1 and 2.

During normal operation of the treating apparatus while exploiting the improved process of sterilizing, the milk is delivered in bulk to the supply orifice 10 through the supply pipe 2. The upper rotors 3, 4 are revolving to remove a succession of relatively small batches of the milk from the orifice 10 and are transporting the same in the form of a relatively thin layer along the heated arcuate bounding surfaces 37 of the upper chambers. As these batches are advanced over the heated surfaces, the fluid in direct contact with the surfaces is constantly wiped off by the advancing rotor teeth, and is circulated within the confines of the adjacent recess where it is further uniformly heated by the steam admitted to the hollow interior 32 of each of the rotors 3, 4. The steam temperatures within the jackets 8 and rotor interiors 32, are preferably such that the temperature of the milk is quickly raised a considerable amount, but not necessarily sufficient to effect complete sterilization.

The milk thus initially heat treated, is eventually delivered into the intermediate orifice 11, wherein the product is protected against overheating and consequent burning, by means of a cooling jacket, as in the case of the inlet orifice 10. These cooling jackets are desirable in view of the absence of the wiping action in these orifices. From the intermediate orifice, the preheated milk is again removed in the form of relatively thin layers each comprising a succession of small batches, by the lower revolving rotors 5, 6. While the milk is being advanced and constantly wiped from the arcuate surfaces 37 of the lower set of chambers, the small batches are subjected to sterilizing temperatures preferably considerably above the scorching or burning temperature of the product, by steam admitted to the jackets 9 and to the hollow interiors 34 of the rotors 5, 6. The milk is thus completely and quickly sterilized without danger of deteriorating the product as to taste or color, and is eventually delivered to the water jacketed orifice 12 either for further heat treatment or for cooling preparatory to final packing.

As the sterilized milk passes by gravity through the passage 14 of the cooling coil 13, it is quickly cooled to the desired temperature for packing, by the cooling water admitted to the jacket 15, whereupon the final product may be placed into the cans by a filler 18 and the cans subsequently sealed in the closing machine 19. In order to further protect the treated product, the packing is preferably effected within a sealed, steam heated chamber confined within the casing 20, thus insuring sterile final packed batches of the product.

From the foregoing description, it will be apparent that the invention in fact provides a simple and highly effective process of and apparatus for quickly sterilizing fluid such as milk, without danger of scorching or otherwise degrading the product. The constant wiping action at the heated surfaces 37, prevents the product from sticking to these surfaces, and the capacity of the sterilizer may be readily made sufficient to accommodate one or more high speed fillers 18 and closing machines 19. The final product while being effectively sterilized will have the delicious taste and color of natural milk, and the heating may be carried to a much higher degree than has heretofore been permissible with any prior known apparatus. The degree of heating may also be effectively controlled by providing suitable control valves in the heating medium supply pipes and by operating the rotors 3, 4, 5, 6 at a proper selected speed, and these controls may be readily effected automatically thereby eliminating the unreliable human element.

While the invention has been specifically described in connection with the treatment of milk, it will be apparent that the novel features are more generally applicable to the treatment of other fluids having characteristics similar to those of animal milk. Any heating medium may also be substituted for the steam heating referred to, and any cooling medium may be substituted for the cold water likewise referred to.

It should be understood that it is not desired to limit the invention to the exact steps of the method and to the precise details of construction of the apparatus herein shown and described, for various modifications within the scope of the claims may occur to those skilled in the art.

It is claimed and desired to secure by Letters Patent:—

1. The process of sterilizing liquid, which comprises, positively conveying successive segregated batches of the liquid along and in direct contact with a succession of surfaces heated to temperatures sufficiently high to deteriorate the liquid and to effect rapid and complete sterilization thereof, repeatedly wiping each batch of liquid from said surfaces before deterioration thereof due to prolonged contact with the latter can take place, and subjecting each batch while in motion to additional heat independently supplied to the portions of said liquid remote from said surfaces.

2. The process of sterilizing liquid, which comprises, transporting successive segregated batches of liquid along and in direct contact with a succession of surfaces progressively heated to increasing temperatures to effect rapid and complete sterilization of the liquid, the highest of said temperatures being above the normal deterioration temperature of the liquid, repeatedly wiping each batch of liquid from said surfaces before deterioration thereof due to prolonged contact with a heated surface can take place, and subjecting each batch while in motion to additional heat independently supplied to the portions of said liquid remote from said surfaces.

OSWALD H. HANSEN.